UNITED STATES PATENT OFFICE.

CLARK H. BENNETT, OF CHICAGO, ILLINOIS, ASSIGNOR TO CORNELL WOOD-PRODUCTS COMPANY, OF CORNELL, WISCONSIN, A CORPORATION OF WISCONSIN.

SIZING.

1,299,663.   Specification of Letters Patent.   Patented Apr. 8, 1919.

No Drawing.   Application filed March 15, 1917.   Serial No. 155,050.

*To all whom it may concern:*

Be it known that I, CLARK H. BENNETT, a citizen of the United States, residing at Chicago, county of Cook, State of Illinois, have invented a certain new and useful Improvement in Sizing, and declare the following to be a full, clear, and exact description of the same, such as will enable others skilled in the art to which it pertains to make and use the same.

My invention has for its object to produce a novel sizing for wall board or other devices made of pulp or fiber which will give a surface that is more impervious to moisture, that will better stop suction when paint is applied to the surface, and will be better adapted as a drying surface for a coat of paint than it has heretofore been possible to obtain with such sizings as have come to my attention.

One of the common sizings consists of resin and wax such as paraffin or its equivalent, but such a sizing is far from satisfactory. I have found that by combining with wax and resin an oil or oils, much more satisfactory results are obtained. I have also found that the addition of a neutralizing agent, decreasing the acidity and raising the melting point of the resin, adds to the value of the sizing. As the neutralizing agent there may be employed caustic soda, or sal soda, bicarbonate of soda, soda ash, quick lime, air slaked lime, magnesium oxid, etc. Furthermore, by the addition of manganese dioxid and lead oxid, drying properties are given to the sizing which insure that there will be no defect in the sized surface by reason of improper drying. A solvent such as turpentine, benzin, kerosene, benzole, solvent naphtha, etc., may be used if desired and, where used, it will be in amounts varying with the temperature at which the sizing is to be applied; the greater the amount of the solvent, the lower the temperature at which the sizing may be applied.

Instead of wax, fats or fatty acids may be employed, or there may be a combination of fats, fatty acids and wax, or any of them. Thus, in addition to paraffin wax, beef or mutton tallow, horse fat, lard, wool fat, stearic acid, bees wax, carnauba wax, ceresin wax, Japan wax, paraffin shale, vaseline, parolite, alumina stearate, alumina palminate, asphaltum and gilsonite are available. Oils that may be used to advantage are corn oil, cotton seed oil, linseed oil, palm oil, rape oil, soy bean oil, tung (China wood) oil, paraffin oil, neutral oil and the petroleum oils.

The following formulas represent preferred examples of my invention or discovery:

I.

| | |
|---|---:|
| Resin | 60.0 |
| Calcium hydroxid | 2.0 |
| Paraffin wax | 12.5 |
| Paraffin oil | 22.1 |
| Manganese dioxid | 1.4 |
| Lead oxid | 2.0 |
| | 100.0 |

II.

| | |
|---|---:|
| Resin | 60.0 |
| Lime or calcium hydroxid | 2.0 |
| Paraffin oil | 10.0 |
| Paraffin wax | 12.5 |
| Tung (China wood) oil | 12.1 |
| Manganese dioxid | 1.4 |
| Lead oxid | 2.0 |
| | 100.0 |

III.

| | |
|---|---:|
| Resin | 60.0 |
| Calcium hydroxid | 2.5 |
| Stearic acid | 10.0 |
| Tallow | 2.5 |
| Paraffin oil | 10.0 |
| Wood oil | 11.6 |
| Mang. dioxid | 1.4 |
| Lead oxid | 2.0 |
| | 100.0 |

IV.

| | |
|---|---:|
| Resin | 60.0 |
| Stearic acid | 10.0 |
| Calcium hydroxid | 2.5 |
| Tallow | 2.5 |
| Wood oil | 21.6 |
| Mang. dioxid | 1.4 |
| Lead oxid | 2.0 |
| | 100.0 |

In making the sizing it is preferable that the method commonly used in the manufacture of varnish be employed, that is the constituents being given a heat treatment or cooked; the temperature being sufficient to combine the neutralizing agent and drying agent with the resin and oils and the fats being added at the end of the cook. In the case of solvents, the addition is made after the fats or waxes, while any of the oils before mentioned may be cooked with the resin.

I claim:

1. An insoluble sizing consisting of an oil or oils combined with wax, a resin, a neutralizing agent for decreasing the acidity of the resin, and one or more drying agents.

2. An insoluble sizing made of the following ingredients combined by cooking: A resin sixty parts, wax twelve parts, oil twenty-two parts, drying oxids three parts, and a neutralizing agent for decreasing the acidity of the resin two parts.

3. An insoluble sizing made up of wax, oil, and an alkali, manganese dioxid, lead oxid and a resin cooked together.

4. An insoluble sizing made up of wax, oil, and an alkali, manganese dioxid, lead oxid and a resin in an amount greater than the combined amounts of the other ingredients.

5. A sizing comprising an oil or oils combined with wax, a resin, calcium hydroxid, manganese dioxid and lead oxid.

In testimony whereof, I sign this specification.

CLARK H. BENNETT.